US011170902B2

United States Patent
Stellwag et al.

(10) Patent No.: US 11,170,902 B2
(45) Date of Patent: Nov. 9, 2021

(54) NUCLEAR POWER PLANT AND METHOD FOR OPERATING A NUCLEAR POWER PLANT

(71) Applicant: Framatome GmbH, Erlangen (DE)

(72) Inventors: Bernhard Stellwag, Nuremberg (DE); Jörg Fandrich, Obermichelbach (DE)

(73) Assignee: FRAMATOME GMBH, Erlangen (DE)

( * ) Notice: Subject to any disclaimer, the term of this patent is extended or adjusted under 35 U.S.C. 154(b) by 381 days.

(21) Appl. No.: 15/779,287

(22) PCT Filed: Nov. 22, 2016

(86) PCT No.: PCT/EP2016/078434
§ 371 (c)(1),
(2) Date: May 25, 2018

(87) PCT Pub. No.: WO2017/093079
PCT Pub. Date: Jun. 8, 2017

(65) Prior Publication Data
US 2018/0322969 A1    Nov. 8, 2018

(30) Foreign Application Priority Data

Nov. 30, 2015   (DE) ................ 10 2015 120 722.2

(51) Int. Cl.
*G21C 17/022*   (2006.01)
*G21C 19/307*   (2006.01)
(Continued)

(52) U.S. Cl.
CPC ............ *G21C 17/0225* (2013.01); *C02F 5/10* (2013.01); *C23F 11/122* (2013.01);
(Continued)

(58) Field of Classification Search
CPC .... F22B 37/025; F22B 37/483; F22B 35/004; G21C 19/30; G21C 17/0225; G21C 19/307; C02F 5/10; C23F 11/122
(Continued)

(56) References Cited

U.S. PATENT DOCUMENTS 3,663,725 A * 5/1972 Pearl ................. C23F 11/18
                                                     376/306
3,976,541 A * 8/1976 Stiteler ............... G21D 1/02
                                                     376/310
(Continued)

FOREIGN PATENT DOCUMENTS

DE        10030726 B4    1/2006
EP         2193524 B1    5/2013
(Continued)

OTHER PUBLICATIONS

Kawamura, et al., PWR secondary water chemistry guidelines in Japan—Purpose and technical background, Progress in Nuclear Energy, vol. 114, 2019, pp. 121-137. (Year: 2019).*
(Continued)

*Primary Examiner* — Sharon M Davis
(74) *Attorney, Agent, or Firm* — Dilworth IP, LLC

(57) ABSTRACT

A nuclear power plant comprising a primary coolant circuit, a steam-water circuit separated from the primary coolant circuit and a steam generator connected to the primary coolant circuit and the steam-water circuit to transfer heat from the primary coolant circuit into the steam-water circuit has at least one dosing point in the steam-water circuit to inject a reducing agent into the steam-water circuit, wherein the reducing agent is an organic compound consisting of carbon, hydrogen and oxygen. Furthermore, a method for operating said nuclear power plant and the use of the method
(Continued)

for downtime preservation of the secondary side of a steam generator of a nuclear power plant are provided.

19 Claims, 1 Drawing Sheet

(51) Int. Cl.
  *C02F 5/10*  (2006.01)
  *C23F 11/12* (2006.01)
  *F22B 37/02* (2006.01)
  *G21D 1/04*  (2006.01)
(52) U.S. Cl.
  CPC .......... *F22B 37/025* (2013.01); *G21C 19/307* (2013.01); *G21D 1/04* (2013.01)
(58) Field of Classification Search
  USPC .................................................. 376/305, 306
  See application file for complete search history.

(56) References Cited

U.S. PATENT DOCUMENTS

| | | | | |
|---|---|---|---|---|
| 4,775,005 A * | 10/1988 | Beyer | ............... | C23F 15/00 165/134.1 |
| 5,796,799 A * | 8/1998 | Kobayashi | ............... | C25B 1/10 204/263 |
| 6,350,376 B1 * | 2/2002 | Imaoka | ............... | C02F 1/70 210/198.1 |
| 6,724,854 B1 | 4/2004 | Kim et al. | | |
| 2005/0018805 A1 * | 1/2005 | Ishida | ............... | G21C 17/0225 376/305 |
| 2005/0135542 A1 * | 6/2005 | Stellwag | ............... | G21C 15/28 376/277 |
| 2007/0237702 A1 * | 10/2007 | Nebrig, Jr. | ............... | B01J 19/0086 423/352 |
| 2009/0086878 A1 * | 4/2009 | Stellwag | ............... | G21C 17/0225 376/207 |
| 2010/0246746 A1 * | 9/2010 | Connor | ............... | G21C 17/0225 376/306 |
| 2010/0300218 A1 | 12/2010 | Fruzzetti et al. | | |

FOREIGN PATENT DOCUMENTS

| | | |
|---|---|---|
| JP | 2005010160 A | 1/2005 |
| JP | 2010096534 A | 4/2010 |
| WO | 00/46423 A1 | 8/2000 |

OTHER PUBLICATIONS

Takiguchi et al., Water Chemistry Data Acquisition, Processing, Evaluation and Diagnostic Systems in Light Water Reactors, Journal of Nuclear Science and Technology, 41:2, 2004, 214-225. (Year: 2004).*

PCT International Search Report and Written Opinion dated Feb. 20, 2017 from corresponding Application No. PCT/EP2016/078434.

* cited by examiner

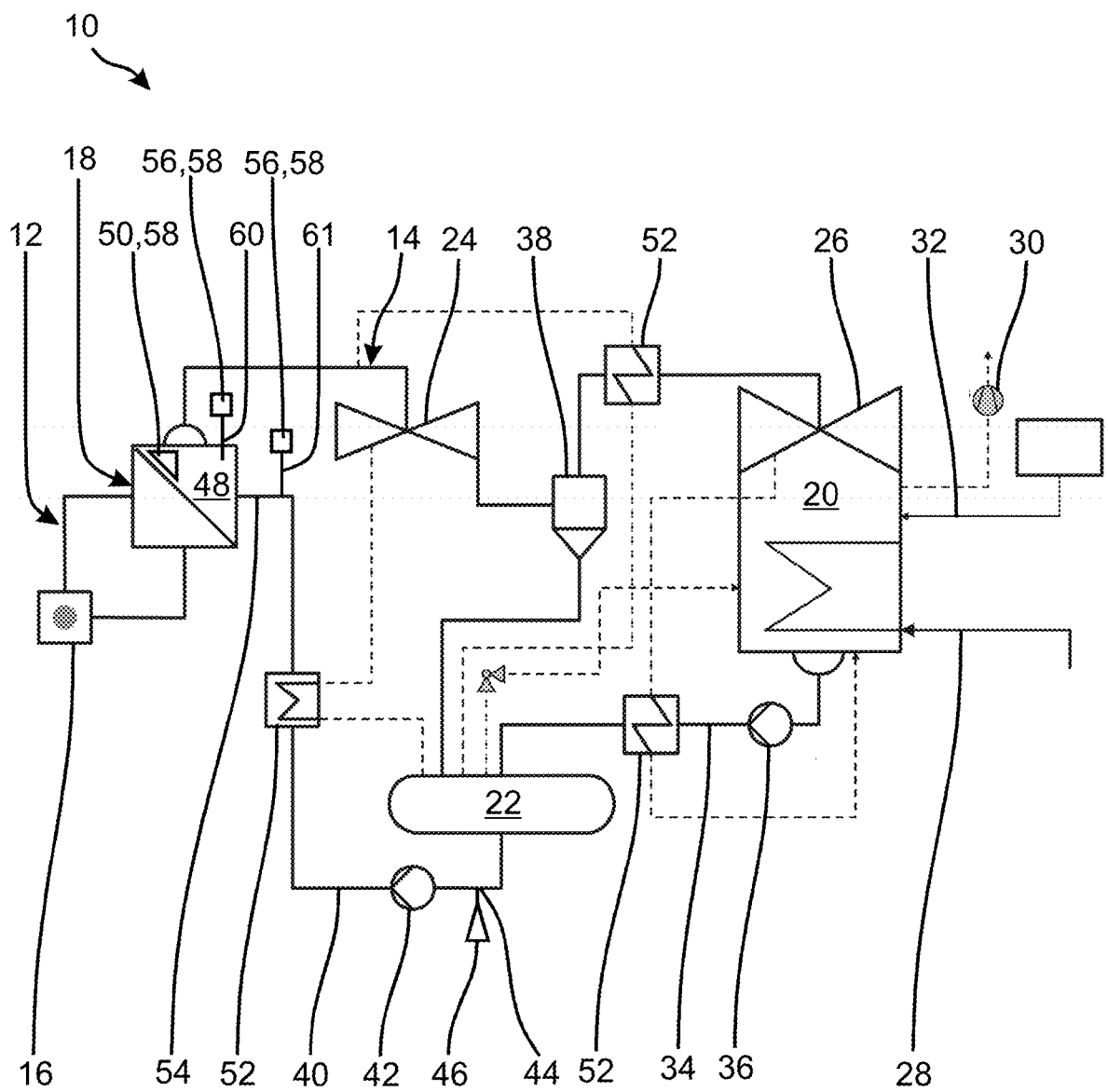

NUCLEAR POWER PLANT AND METHOD FOR OPERATING A NUCLEAR POWER PLANT

FIELD OF THE INVENTION

The invention relates to a nuclear power plant comprising a primary coolant circuit and a steam-water circuit separated from the primary coolant circuit. More specifically, the invention relates to a method for operating said nuclear power plant.

BACKGROUND OF THE INVENTION

Nuclear power plants comprising a primary coolant circuit and a steam-water circuit separated from the primary coolant circuit are known. They are operated in particular by means of pressurized-water reactors or heavy-water reactors. Due to their construction and the materials used, the steam generators of nuclear power plants have to be operated under reducing conditions. Even during the plant's downtime it is required to protect the materials on the secondary side of the steam generators from corrosion by using reducing conditions. This is also referred to as downtime preservation. For both tasks hydrazine is used as a reducing agent.

During power operation of nuclear power plants hydrazine causes the following reactions to occur in the steam-water circuit of nuclear power plants:

oxygen binding by the reaction $N_2H_4+O_2 \rightarrow N_2+2\ H_2O$. The removal of the oxidant $O_2$ and, if applicable, of other oxidants such as copper ions facilitates the setting of reducing conditions.

reducing conditions by additional electrochemical hydrazine oxidation on the parts' surfaces according to the reaction $N_2H_4+4\ OH^- \rightarrow N_2+4\ H_2O+4\ e^-$. Under standard conditions, the equilibrium electrode potential of this reaction is −330 mV against the hydrogen electrode.

The reactions with hydrazine are thermally activated, causing a gradual transition from oxidizing to reducing conditions already in the condensate and feed water system of light-water and heavy-water reactors. When the feed water enters the steam generators and in the circulating water on the secondary side of the steam generators, hydrazine reacts with such a high rate that reducing conditions are ensured.

In power plants operated with conventional energy sources specific oxidizing conditions are set in the condensate and feed water system using small amounts of oxygen. In so doing, the components' discharge of iron and thus also the introduction of corrosion products into the steam boiler is reduced. For this reason, the VGB standard regarding the quality of feed water, boiler water and steam in industrial power plants (VGB-S-010-T-00; 2011-12.DE) only recommends the AVT(O) operating mode, among the specified AVT operating modes (AVT=all volatile treatment), in which conditioning is performed only with ammonia, without adding any reducing agents. According to this standard, the AVT(R) operating modes in which an additional volatile reducing agent is added as an oxygen binder should be used only in exceptional cases.

Hydrazine is a very good oxygen binder. The known operation of the secondary steam-water circuit of pressurized-water reactors by adding hydrazine as a reducing agent thus corresponds to an AVT(R) operating mode. In hydrazine-containing media, the exact adjustment of the oxygen content in the circuit systems and thus an AVT(O) conditioning of the steam-water circuit systems of light-water and heavy-water reactors are not possible. In addition, hydrazine, as a strong reducing agent, can reinforce the erosion corrosion in the circuit systems.

Some plants avoid the use of hydrazine by using carbohydrazide. Carbohydrazide exhibits similar properties as hydrazine and is also a strong reducing agent.

From EP 2 193 524 B1 a nuclear power plant comprising a boiling-water reactor is known in whose reactor cooling system, apart from hydrazine, an alcohol is used as a reducing agent. The alcohol injection is performed in the primary coolant circuit that passes also through the reactor core.

DE 100 30 726 B4 shows a method for suppressing corrosion in reactor parts in which a photocatalytic substance is used that deposits on the surface of reactor parts protecting them from corrosion. Hydrogen or methanol can be injected into the reactor water of the primary coolant circuit through a feed water system.

Both are methods for treating cooling water in boiling-water reactors which are characterized in that a high gamma radiation field prevails in the entire primary coolant circuit. Thus, boiling-water reactors fundamentally differ from pressurized-water reactors or heavy-water reactors which comprise a steam-water circuit separated from the primary coolant circuit and a steam generator connected to the primary coolant circuit and the steam-water circuit to transfer heat from the primary coolant circuit into the steam-water circuit.

WO 00/46423 A relates to a detergent composition and methods for the removal of deposits from steam generators of nuclear power plants operated by pressurized-water reactors. The aqueous composition contains 1-hydroxyethylidene-1,1-diphosphonic acid and at least one ethoxylated mercaptan or oxidized ethoxylated mercaptan. Together with the detergent composition, further chemicals can be introduced into the secondary circuit of the pressurized-water reactor, for example reducing agents such as ascorbic acid, hydroquinone, sodium sulfite, diethylhydroxyamine, hydrazine, isoascorbic acid or carbohydrazide.

It is an object of the invention to provide an effective and user-friendly corrosion protection in the secondary steam-water circuit of a nuclear power plant, in particular of a pressurized-water reactor or heavy-water reactor, without recourse to toxic reducing agents such as hydrazine.

In order to solve the object, a nuclear power plant is provided comprising a primary coolant circuit with a steam-water circuit separated from the primary coolant circuit and a steam generator connected to the primary coolant circuit and the steam-water circuit to transfer heat from the primary coolant circuit into the steam-water circuit. The steam-water circuit has at least one dosing point to introduce a reducing agent into the steam-water circuit, the reducing agent being an organic compound consisting of carbon, hydrogen and oxygen, and means to control the concentration of the reducing agent that is used to set a predetermined oxygen concentration in the steam-water circuit, while reducing conditions prevail within the steam generator (18).

The inventors have recognized that alternative reducing agents first have to be able to allow the exact setting of small amounts of oxygen in the circuit systems to ensure an AVT(O) operation recommended for industrial power plants in the facilities of the steam-water circuit outside the steam generator. Second, they have to ensure reducing conditions in the circulating water of nuclear steam generators as the materials used in the steam generator, in particular nickel alloys, can be corroded by an AVT(O) operation. Overall, the alternative reducing agents, if possible, should have the following chemical properties:

no $O_2$ binding in the steam-water circuit systems but in the circulating water system of nuclear steam generators;

no strong electrochemical reducing effect in steam-water circuit systems except the nuclear steam generators;

no strain and premature exhaustion of the capacity of the anion and cation exchange resins in the condensate purification facility and the steam generator's blowdown demineralization facility; and no carcinogenic, toxic or other chemical properties that would severely impair the handling of the reducing agent in the nuclear power plant.

Instead of hydrazine or other strong oxygen binders and reducing agents, low molecular weight and nitrogen-free C, H, O compounds are dosed into the secondary steam-water circuit of the light-water or heavy-water reactor. Low molecular weight means here a molecular weight of less than 800 g/mol, preferably less than 400 g/mol. The radiation field present inside the nuclear steam generator on the secondary side is sufficient for the following chemical reactions to be induced in the circulating water:

oxygen binding: for example, in the case of methanol, by the reaction $CH_3OH + 3/2\ O_2 \rightarrow CO_2 + 2\ H_2O$;

high reducing effect: Under standard conditions, the cell potential for the electrochemical oxidation of methanol to form $CO_2$ according to the reaction $CH_3OH + H_2O \rightarrow CO_2 + 6\ H^+ + 6\ e^-$ is +20 mV against the hydrogen electrode.

Thus, low molecular weight C, H, O compounds also cause strong reducing conditions inside the nuclear steam generator. As a result, the use of low molecular weight and nitrogen-free C, H, O compounds allows for the targeted setting of reducing conditions in the nuclear steam generator, making the use of hydrazine no longer necessary. In the secondary steam-water circuit system outside the nuclear steam generator the C, H, O compounds are largely inactive towards oxygen, allowing for the setting of oxidative conditions.

SUMMARY OF THE INVENTION

According to an advantageous embodiment the reducing agent when exposed to gamma radiation acts as an oxygen scavenger. As the reducing reactions are only induced by the gamma radiation present in the steam generator, the oxygen content in the steam-water circuit can be exactly adjusted, thus allowing for an AVT(O) operating mode to be used in the steam-water circuit of the light-water or heavy-water reactor. In turn, as a result of the AVT(O) operating mode in the plant, alkalization with ammonia or other organic amines is sufficient to ensure low iron discharge and sufficient resistance to erosion corrosion in the circuit system. Preferably, conditioning of the steam-water circuit system can be performed using only ammonia, without adding any organic amines.

According to another advantageous embodiment the reducing agent is selected from the group consisting of C1-C6 alcohols, aldehydes and ketones or mixtures thereof. The advantage of these volatile low molecular weight C, H, O compounds is that they are not removed in the water purification facilities, for example in the condensate purification facility or the blowdown demineralization facility, as is the case with conventional reducing agents such as hydrazine. Thus, they can also be introduced into the system upstream from the water purification facilities, increasing the number of possible dosing points in the plant.

In a particularly advantageous embodiment the reducing agent is a C1-C6 alcohol, preferably propanol, ethanol or methanol, particularly preferably methanol. The alcohols have the advantage, compared to many other reducing agents, that they are no hazard to the environment, thus allowing safe handling with little effort. They can be easily shipped, stored and handled.

In another advantageous embodiment the steam-water circuit has a condenser and a main condensate pump. In addition, the dosing point is located between the condenser and the main condensate pump. The condenser serves to return condensed water vapor back into the steam-water circuit, thus reducing the plant's water consumption. The location of the dosing point downstream from the condenser allows for the quality of the condensate to be checked prior to the addition of the reducing agent.

According to a preferred embodiment the steam-water circuit has a feed water container. In addition, the dosing point is located downstream from the feed water container. The feed water container maintains the feed water utilized to supply the steam generator and to compensate for the water withdrawn from the system. As part of the reducing agent is again removed in the feed water container by degassing, it is advantageous to introduce the reducing agent into the steam-water circuit between the feed water container and the feed water pumps. Moreover, the location of the dosing point downstream from the feed water container allows for the quality of the feed water to be checked prior to the addition of the reducing agent. As an alternative to the feed water container, a feed water introduction device can be connected to the steam-water circuit.

According to another preferred embodiment, at least one device for measuring the concentration of the reducing agent and/or of the redox potential is provided in the steam-water circuit. The measurements serve to monitor the water quality in the steam-water circuit and to adjust the desired conditions, i.e. adjustment of a low predetermined oxygen content in the circuit system and ensuring of reducing conditions in the circulating water of the steam generator.

Reducing conditions means that, under standard conditions (reduction half-cell potential), the redox potential of the respective medium, here of the circulating water at operating temperature, against the hydrogen electrode is less than 0 V, preferably less than −10 mV.

Another object of the invention is a method for operating a nuclear power plant comprising a primary coolant circuit, a steam-water circuit separated from the primary coolant circuit and a steam generator connected to the primary coolant circuit and the steam-water circuit to transfer heat from the primary coolant circuit into the steam-water circuit. An organic reducing agent consisting of carbon, hydrogen and oxygen is introduced into the steam-water circuit, with the concentration of the reducing agent being controlled such that a predetermined oxygen concentration of preferably not more than 0.1 mg/kg is set in the steam-water circuit, while reducing conditions prevail within the steam generator.

Limiting the oxygen concentration in the steam-water circuit allows the AVT(O) operating mode of the steam-water circuit and thus ensures sufficient resistance to erosion corrosion in the steam-water circuit. For example, hematite protective layers form on steel surfaces, and copper(I)-oxide protective layers form on copper-containing surfaces, reducing the corrosion rate of these materials. At the same time, the gamma radiation present in the steam generator allows for an AVT(R) operating mode to be applied there which ensures the necessary corrosion resistance of the parts in the steam generator.

According to an advantageous embodiment a pH of more than 7, particularly preferably of more than 8.5 is set in the steam-water circuit. Additionally, as the solubility of iron oxides at a high pH is reduced, steel surfaces in the steam-water-circuit are protected from corrosion by this procedure.

According to another advantageous embodiment the concentration of the reducing agent is continuously measured, which allows very precise process monitoring and control leading to cost savings.

In a preferred embodiment the consumption of the reducing agent in the steam generator is continuously determined. In so doing, conclusions can be drawn with regard to the conditions in the steam-water circuit, allowing safe monitoring of the system.

In another preferred embodiment the steam-water circuit comprises a feed water portion and a main condensate portion, with the oxygen content in the main condensate and/or in the feed water being analyzed and used as a control parameter for the concentration of the reducing agent. In this way, the water quality is monitored and constant conditions in the steam-water circuit are ensured. The concentration of the reducing agent in the feed water is preferably in the range from 10E-6 mol/kg to 10E-3 mol/kg. When using methanol as a reducing agent these concentrations correspond to a range from approximately 10 µg/kg to 35 mg/kg.

According to a preferred embodiment the steam generator has a circulation space in which circulating water circulates to absorb heat from the primary coolant circuit. The circulation space comprises the space formed by the housing of the steam generator and the sheath surrounding the heat transfer facilities. The concentration of the reducing agent in the circulating water is preferably in the range from 10E-7 mol/kg to 10E-3 mol/kg, preferably from 3×10E-7 mol/kg to 3×10E-4 mol/kg. When using methanol these values correspond to a range from approximately 1 µg/kg to 35 mg/kg or 3 to 10 mg/kg. Due to the setting of the concentration of the reducing agent it is guaranteed that, during operation of the plant, there will always be reducing conditions in the steam generator.

According to a preferred embodiment the steam-water circuit has a feed water portion with a feed water inlet and the steam generator comprises a circulation space in which circulating water circulates to absorb heat from the primary coolant circuit, with the concentration of the reducing agent being determined in the feed water or additionally or alternatively in the circulating water by means of TOC flowmeters (TOC=total organic carbon). By determining the concentration of the reducing agent the dosing of the reducing agent can be adjusted and a continuous monitoring of the system is possible.

In an advantageous embodiment the steam-water circuit comprises a circulation space, with the redox and/or corrosion potential being measured in the circulating water of the steam generator by means of a potential sensor. The corrosion potential is defined as the electrode potential of the material in contact with the surrounding medium against a commercially available reference electrode, for example an Ag/AgCl electrode. By monitoring the water quality in the circulating water, reducing conditions in the circulating water of the steam generator can be specifically set and maintained.

In another advantageous embodiment the steam-water circuit comprises a circulation space, with the redox potential in the circulating water being continuously measured and used as a control parameter for the dosing of the reducing agent. In so doing, operation-related fluctuations in the concentration of the reducing agent can be specifically compensated, thus ensuring defined conditions.

According to a preferred embodiment, the redox and/or corrosion potential to adjust oxidizing conditions in the steam-water circuit and, at the same time, the redox and/or corrosion potential in the circulating water of the steam generator are measured to adjust and ensure reducing conditions in the steam generator. Oxidizing conditions means that the redox potential of the respective medium at operating temperature is more than 0 V, preferably more than 10 mV, measured against the hydrogen electrode under standard conditions, with a predetermined oxygen concentration of preferably 0.1 mg/kg in the medium not being allowed to be exceeded. In this way, the simultaneous operation of the steam generator under AVT(R) conditions and of the steam-water circuit under AVT(O) conditions can be monitored and controlled in the same circuit using the same coolant.

Another object of the invention is the use of the described method for the downtime preservation of the steam generator, with the concentration of the reducing agent on the secondary side being 5×10E-6 to 5×10E-2 mol/kg, corresponding to approximately 30 µg/kg to 1000 mg/kg methanol. Even during reactor downtime, nuclear steam generators exhibit high radiation fields. Thus, low molecular weight C, H, O compounds (M<800 g/mol) are also suitable for downtime preservation as the necessary gamma rays are present in a sufficient amount for the C, H, O compounds on the secondary side of the nuclear steam generators to be able to act as oxygen scavengers.

BRIEF DESCRIPTION OF THE DRAWINGS

FIG. 1 illustrates a schematic view of a simplified steam-water circuit in a nuclear power plant.

DETAILED DESCRIPTION OF THE INVENTION

Further advantages and features can be seen from the following description in conjunction with the attached drawing which, however, is not to be understood as limiting.

In FIG. 1 a nuclear power plant 10 comprising a primary coolant circuit 12 and a steam-water circuit 14 separated therefrom is shown which comprises a reactor 16 through which the primary coolant circuit 12 flows, and a steam generator 18, a condenser 20 and a feed water container 22 in the steam-water circuit 14.

Preferably, the reactor 16 is a pressurized-water reactor. The heat generated in the reactor 16 is conveyed via the primary coolant circuit 12 to the steam generator 18 where it is transferred to the steam-water circuit 14. In a first high-pressure turbine 24 and in a second low-pressure turbine 26 the thermal energy of the hot water vapor is converted into kinetic energy which is finally used to drive generators (not shown) and thus to generate electrical energy.

In the condenser 20 the cooled water vapor is transferred into its liquid phase forming the main condensate. To this end, the condenser 20 is cooled by a cooling water supply line 28 and the warm waste gases are discharged via a waste gas pump 30. Losses are compensated for by a balance water supply line 32.

The main condensate is conveyed from the main condensate portion 34 leading from the condenser 20 to the feed water container 22 via a main condensate pump 36 into the feed water container 22. In the feed water container 22 the main condensate as well as water from a water separator 38, located between the high-pressure turbine 24 and the low-pressure turbine 26, are collected and maintained for supply to the steam generator as feed water.

In the feed water portion 40 leading from the feed water container 22 to a feed water supply line 54 at the steam generator the feed water, by means of a feed water pump 42, is pumped back into the steam generator 18 where it is reused to absorb heat and the secondary steam-water circuit 14 is closed. In the feed water portion 40, between the feed water container 22 and the feed water pump 42, a dosing point 44 is located where a reducing agent consisting of carbon, hydrogen and oxygen, preferably methanol, is introduced into the steam-water circuit 14 by means of a dosing device 46.

In the steam generator 18, the reducing agent is exposed to gamma radiation and acts as an oxygen scavenger. An apparatus 50 to continuously measure the concentration of the reducing agent and the redox potential is provided in the circulation space 48 of the steam generator. To this end, the apparatus 50 comprises a potential sensor 58.

As an alternative or in addition, the concentration of the reducing agent in the circulating water can be continuously measured by means of a TOC flowmeter 56 in a sampling line 60 leading out of the steam generator 18. As there is no radiation field in the sampling line 60, the concentration of reducing agents, in particular alcohols, in the sampling line 60 does not change.

Moreover, the feed water supply line 54 can be additionally provided with a sampling line 61 upstream from the steam generator 18 to perform measurements by means of a TOC flowmeter 56 and/or a potential sensor 58.

Intermediate heaters 52 are located between the water separator 28 and the low-pressure turbine 26 as well as in the main condensate portion 34 and the feed water portion 40 which are used to return released thermal energy back into the steam-water circuit 14.

In the following, the method for operating the nuclear power plant 10 is described by the example of a 1000 MW plant using methanol as a reducing agent.

For the start-up and power operation of the reactor 16 a methanol concentration of 3 µg/kg to 10 mg/kg is set in the circulating water of the steam generator. The methanol concentration set for the feed water is 2 to 3 times higher to compensate for losses caused by the easier evaporation of methanol and degassing.

For downtime preservation a methanol concentration of 30 µg/kg to 1000 mg/kg is provided in the steam generator on the secondary side.

The daily amount of methanol that has to be supplied during power operation to obtain a corresponding concentration depends on the plant output and is here in the range from 16 kg/d to 41 kg/d. Thus, in the case of a conventional reducing agent tank having a tank volume of 1500 L one tank filling is sufficient to convey methanol into the steam-water circuit 14 for several weeks before the tank has to be refilled. Due to the higher feed water flows, the amounts of methanol for a 1300 MW plant are elevated by approximately 25 percent.

The injection of methanol into the steam-water circuit allows to adjust oxidative conditions in the steam-water circuit 14 outside of the steam generator 18 (AVT(O) operating mode), with the oxygen concentration in the steam-water circuit 14 being maintained at less than 0.1 mg/kg according to the VGB standard.

In addition, a pH of greater than 9.5 is set in the steam-water circuit 14. The alkaline pH is preferably set by using volatile nitrogen compounds such as ammonia and other organic amines, particularly preferably ammonia.

Preferably, the methanol is introduced into the steam-water circuit 14 downstream from the feed water container 22 at the dosing point 44 by means of the dosing device 46 as part of the methanol is lost by degassing in the feed water container 22, thus allowing for the methanol used to be utilized more efficiently.

In an embodiment (not shown) of a nuclear power plant 10 without a feed water container 22 it can be advantageous to choose, instead of the dosing point 44, an alternative dosing point, for example directly upstream from the steam generator 18 or directly downstream from the water separator 38. It is also possible that several dosing points 44 are provided in the steam-water circuit 14. As a rule, the most suitable dosing point 44 for the respective plant should be determined together with the operator.

Methanol and other water-soluble organic low molecular weight compounds consisting of carbon, hydrogen and oxygen are not removed in water purification facilities (not shown) and can thus also be introduced into the steam-water circuit 14 upstream from the water purification facilities. This offers an advantage as the number of possible dosing points 44 in the power plant 10 is hereby extended.

Especially, in nuclear power plants 10, existing dosing points 44 used for the dosing of reducing agents such as hydrazine can also be used to introduce methanol. When using C, H, O compounds, the addition of the so-called alternative amines such as ethanolamine (ETA), dimethylamine (DMA), methoxypropylamine (MPA) or morpholine can be omitted. Thus, even those possibly existing dosing devices 46 which are generally suitable for methanol dosing may be used.

To measure and adjust the concentration of methanol in the steam-water circuit 14 the oxygen content in the main condensate of the main condensate portion 34 and in the feed water of the feed water portion 40 is monitored. To this end, continuous measurements using commercially available sensors with a measuring accuracy in the ppb range (µg/kg) are performed. As this measurement method is continuous, the measured signals can be used as an input parameter for process control.

Compared to that, when using hydrazine as a reducing agent according to the state-of-the-art methods, the hydrazine concentration in the steam-water circuit 14 is determined by photometric measurements. This is a discontinuous measurement method whose frequency of analysis is mostly one week. For start-up operation, the hydrazine concentration of the circulating water is specified as the measured quantity. For power operation, the hydrazine content of the feed water is specified as monitoring parameter. Hydrazine has to be measured in the feed water during power operation as the thermal decomposition of hydrazine according to the reaction $3\ N_2H_4 \rightarrow 4\ NH_3 + N_2$ in the circulating water takes place at very high rate such that measurements in the circulating water do not yield any evaluable results. Even during measurement of the hydrazine concentration in the feed water substantial fluctuations of the measured values occur due to the thermal decomposition of hydrazine taking place between sampling and measurement.

For the reasons mentioned, continuous process monitoring and, if applicable, control of the concentration of the reducing agent in the feed water is not possible when using hydrazine. Therefore, in most cases, hydrazine concentrations are set which are high enough to ensure reducing conditions in the steam generator 18 even when the oxygen content in the steam-water circuit 14 increases for operational reasons. This causes an unnecessarily high consumption of hydrazine and increases the costs for operation of the plant. Particularly in the case of hydrazine this is aggravated by the fact that the handling and use of chemicals have been strictly limited by statutory requirements. For this reason, the concentration of hydrazine solutions that are allowed to be stored and handled in nuclear power plants 10, for example, is partly not more than 15%.

The concentration of methanol and other low molecular weight C, H, O compounds, however, is measured continuously in the feed water and in the circulating water circulating in the circulation space 48 of the steam generator 18 by means of commercially available TOC flowmeters 56 via sampling lines 60, 61.

Preferably, these continuous measurements can be complemented by additional discontinuous analytical methods, which, for example, can be used to differentiate between various organic compounds.

Commercially available analytical devices and analytical methods also allow for the continuous measurement of the concentration of methanol and other C, H, O compounds having a reducing effect when exposed to gamma radiation both in the circulating water and in the feed water.

Experience with industrial plants shows that, in conventional steam boilers, methanol is thermally stable even at temperatures of up to 530° C. and pressures of 270 bar. If, however, oxidants are present as well in the conventional steam boilers, an oxidative decomposition of methanol takes place. The purely thermal decomposition of methanol in the circulating water of steam generators 18, however, is negligibly small, which allows for the concentration of the reducing agent in the feed water necessary for the plant's respective operating state to be adjusted and controlled based on the current methanol consumption in the steam generator.

Thus, the current methanol consumption in the steam generator 18 through oxygen binding and other radical reactions is determined by continuous measurements taking place in the circulating water and feed water. The total methanol turnover in the steam generator 18 is basically composed of two components:

(1) radiolytic decomposition by the gamma radiation acting on the secondary side of the steam generator 18 (metabolic rate);

(2) radiation-induced oxidative methanol decomposition by oxygen or other oxidizing substances in the steam generator 18 such as copper ions and copper oxides or trivalent iron oxides and hydroxides.

The oxygen introduction into the steam generator 18 is known from the continuous measurement of the oxygen content in the main condensate and in the feed water. By evaluating operating phases with an elevated oxygen content or by specifically increasing the oxygen content in the feed water the methanol consumption by radiation-induced oxidation can be exactly determined and adjusted such that reducing conditions in the steam generators 18 are always guaranteed. This allows to adjust oxidative conditions in the steam-water circuit 14 outside the steam generators 18 (AVT(O) operation) and to simultaneously ensure reducing conditions in the steam generators 18 (AVT(R) operation).

If, for example, a rapid and significant increase in the oxygen concentration is registered in the main condensate and in the feed water, the concentration of the reducing agent in the feed water and thus the methanol turnover in the steam generator can be immediately increased by this adjustment.

Signal control and regulation can also be integrated into the plant control technology.

Thus, the use of low molecular weight C, H, O compounds as reducing agents allows, among other things, very precise need-optimized process monitoring and control.

The invention claimed is:

1. A nuclear power plant comprising a primary coolant circuit, a steam-water circuit separated from the primary coolant circuit and a steam generator connected to the primary coolant circuit and the steam-water circuit to transfer heat from the primary coolant circuit into the steam-water circuit, wherein the steam-water circuit has:
   at least one dosing point to introduce a reducing agent that is an organic compound consisting of carbon, hydrogen and oxygen and set a predetermined oxygen concentration in the steam-water circuit and reducing conditions within the steam generator;
   at least one potential sensor located in the steam generator and configured to measure a redox potential of water in the steam-water circuit, and
   at least one TOC flowmeter configured to measure the concentration of the reducing agent in the steam-water circuit.

2. The nuclear power plant according to claim 1, wherein the reducing agent acts as an oxygen scavenger when exposed to gamma radiation.

3. The nuclear power plant according to claim 1, wherein the reducing agent is selected from the group consisting of C1-C6 alcohols, aldehydes, ketones and mixtures thereof.

4. The nuclear power plant according to claim 3, wherein the reducing agent is a C1-C6 alcohol.

5. The nuclear power plant according to claim 4, wherein the reducing agent is methanol.

6. The nuclear power plant according to claim 1, wherein the steam-water circuit has a condenser and a main condensate pump, and the dosing point is located between the condenser and the main condensate pump.

7. The nuclear power plant according to claim 1, wherein the steam-water circuit has a feed water container, and the dosing point is located downstream from the feed water container.

8. A method for operating a nuclear power plant comprising a primary coolant circuit, a steam-water circuit separated from the primary coolant circuit and a steam generator connected to the primary coolant circuit and the steam-water circuit to transfer heat from the primary coolant circuit into the steam water circuit, the method comprising introducing an organic reducing agent consisting of carbon, hydrogen and oxygen into the steam-water circuit by means of a dosing device,
   measuring a redox potential of water in the steam-water circuit with at least one potential sensor located in the steam generator,
   measuring a concentration of the reducing agent in the water of the steam-water circuit with at least one TOC flowmeter and;
   adjusting the concentration of the reducing agent with the dosing device based on the measured redox potential and reducing agent concentration such that a predetermined oxygen concentration is set in the steam-water circuit and reducing conditions are set within the steam generator.

9. The method according to claim 8, further comprising setting a pH of greater than 7 in the steam-water circuit.

10. The method according to claim 8, wherein the concentration of the reducing agent is continuously measured.

11. The method according to claim 8, wherein the steam-water circuit comprises a main condensate portion leading a main condensate from a condenser to a feed water container, where the main condensate and water from a water separator are collected and maintained for supply as feed water and a feed water portion leading from the feed water container to a feed water supply line at the steam generator, the method further comprising analyzing and controlling the oxygen content in the main condensate and/or the feed water with the concentration of the reducing agent.

12. The method according to claim 8, wherein the steam generator has a circulation space in which circulating water circulates to absorb heat from the primary coolant circuit, with the concentration of the reducing agent in the circulating water being in a range from 10E-7 mol/kg to 10E-3 mol/kg.

13. The method according to claim 12, wherein the concentration of the reducing agent in the circulating water is in the range of $3 \times 10E-7$ to $3 \times 10E-4$ mol/kg.

14. The method according to claim 8, wherein the steam-water circuit has a feed water portion comprising a feed water supply line, and that the steam generator comprises a circulation space in which circulating water circulates to absorb heat from the primary coolant circuit, and wherein the concentration of the reducing agent is determined in the feed water and/or in the circulating water by means of the TOC flowmeters.

15. The method according to claim 8, wherein the steam generator further comprises a circulation space in which circulating water circulates to absorb heat from the primary coolant circuit, and wherein the redox and/or corrosion potential is measured in the circulating water by means of the potential sensor.

16. The method according to claim 8, wherein the steam generator further comprises a circulation space in which circulating water circulates to absorb heat from the primary coolant circuit, and wherein the redox potential in the circulating water is measured continuously and used as a control parameter for adjusting the concentration of the reducing agent.

17. The method according to claim 8, wherein the steam generator comprises a circulation space in which circulating water circulates to absorb heat from the primary coolant circuit, and wherein the redox and/or corrosion potential in the steam-water circuit is/are measured to adjust oxidizing conditions in the steam-water circuit and wherein, at the same time, the redox and/or corrosion potential in the circulating water is/are measured to adjust the reducing conditions of the circulating water.

18. The method according to claim 8, wherein the steam generator further comprises a circulation space in which circulating water circulates to absorb heat from the primary coolant circuit and wherein the concentration of the reducing agent in the circulating water is maintained in a range from $5 \times 10E-6$ mol/kg to $5 \times 10E-2$ mol/kg.

19. The method according to claim 8, wherein the predetermined oxygen concentration is not more than 0.1 mg/kg.

* * * * *